United States Patent [19]

Fugleberg

[11] Patent Number: 5,178,842

[45] Date of Patent: Jan. 12, 1993

[54] METHOD FOR PRECIPITATING AND SEPARATING METALS

[75] Inventor: Sigmund P. Fugleberg, Pori, Finland

[73] Assignee: Outokumpu Oy, Helsinki, Finland

[21] Appl. No.: 263,978

[22] Filed: Oct. 26, 1988

Related U.S. Application Data

[63] Continuation of Ser. No. 94,695, Sep. 9, 1987, abandoned.

[30] Foreign Application Priority Data

Mar. 10, 1986 [FI] Finland .................................. 864002

[51] Int. Cl.$^5$ ................................................ C22B 3/44
[52] U.S. Cl. .................................... 423/37; 423/43; 423/48; 423/140; 423/146
[58] Field of Search .................. 423/37, 43, 48, 50, 423/138, 140, 155, 565, 146

[56] References Cited

U.S. PATENT DOCUMENTS

| | | | |
|---|---|---|---|
| 2,352,096 | 6/1944 | Hay ........................ | 423/140 |
| 2,362,216 | 11/1944 | Reed ...................... | 423/37 |
| 3,088,803 | 5/1963 | Mackiw et al. ............ | 423/37 |
| 3,218,161 | 11/1965 | Kunda et al. ............. | 423/37 |
| 3,450,495 | 6/1969 | Thornhill et al. .......... | 423/37 |
| 3,459,535 | 8/1969 | Vizsolyi et al. ........... | 423/48 |
| 3,660,022 | 5/1972 | Staker et al. ............. | 423/37 |
| 3,728,430 | 4/1973 | Clitheroe et al. .......... | 423/37 |
| 3,937,657 | 2/1976 | Parker et al. ............. | 204/108 |
| 4,097,271 | 6/1978 | Swinkels et al. ........... | 423/34 |

*Primary Examiner*—George Wyszomierski
*Assistant Examiner*—Margery Phipps
*Attorney, Agent, or Firm*—Brooks Haidt Haffner & Delahunty

[57] ABSTRACT

According to the method of the invention, at least one or several of the metals nickel, cobalt and copper can be selectively precipitated as sulphide by aid of elemental sulphur from aqueous solutions containing other metals such as zinc. The temperature of the reaction is above the melting point of sulphur. The precipitation is carried out with a pH value below 2. The metals to be precipitated can be present in the solution either as oxides or sulphates. If the metals are sulphates, the sulphide of at least one of the metals is prepared to crystal seeds in the solution before precipitation.

5 Claims, No Drawings

METHOD FOR PRECIPITATING AND SEPARATING METALS

This application is a continuation of application Ser. No. 07/094,695, filed Sep. 9, 1987, now abandoned.

BACKGROUND OF THE INVENTION

1. Field of the Invention

The present invention relates to a method for selectively precipitating metal ions from solutions containing these ions.

2. Description of Related Art

Because the solubilities of the sulphides of various metals are often remarkably different, the separation of metals on the basis of their solubility is a widespread method of separation. The commonest sulphide reagent is hydrogen sulphide, $H_2S$. Hydrogen sulphide is a good reagent because it is a weak acid and thus the $S^{--}$ concentration is easily adjusted by choosing a suitable pH value in the precipitation. The precipitation may take place for example in the following order: Cu, Zn and Co, which are precipitated from their mixed solution by adjusting the pH value to be roughly 1.0 in the Cu precipitation, whereafter the pH value is raised up to about 2.5 and the ZnS is precipitated, and finally the pH value is raised up to 5 and CoS is precipitated. If the initial solution contains for instance Cu, Zn and Co, 10 g/l each, the distribution of copper, zinc and cobalt in the precipitate in percentages is roughly as follows:

|     | Cu | Zn | Co |
| --- | --- | --- | --- |
| CuS | 98 | 2  | 0  |
| ZnS | 2  | 88 | 1  |
| CoS | 0  | 10 | 99 |

This degree of separation is sufficient for utilization in industrial processes, but far from complete.

Moreover, heavy metals such as Cu, Zn, Co, Ni, Pb and Cd can easily be separated from solutions containing large amounts of $Fe^{2+}$, Mn, Mg, Na and Ca, because the sulphides of the latter metals are much more easily soluble.

Other possible sulphide reagents are $Na_2S$, $Ca(HS)_2$, and $(NH_4)_2S$. These reagents behave in a more or less similar fashion to hydrogen sulphide, except that their selectivity is somewhat poorer due to difficulties in avoiding local fluctuation of the pH values and hence fluctuation in the $S^{--}$ concentrations.

There are also known methods for precipitating Ni from solutions containing Co by employing elemental sulphur and iron powder as reagents.

The above mentioned methods have, however, some drawbacks. $H_2S$ is an expensive reagent to produce, it is corrosive and highly poisonous, and therefore while it is being used, care must be continuously taken that the system is absolutely closed. Iron powder, which is used in the other methods, is also an expensive reagent.

In the prior art of chemistry it is also known that some heavy metal oxides react with elemental sulphur in aqueous solutions at high temperatures, about 250° C., in an autoclave and form metal sulphides. The salts of some metals, such as Ag and Hg, may in aqueous solutions form sulphides while reacting with elemental sulphur. When the sulphidizer is elemental sulphur, the reaction goes in principle as follows:

i.e. the sulphur is disproportioned.

SUMMARY OF THE INVENTION

In the method of the present invention, this disproportioning and sulphidizing of sulphur can be effectively utilized in industrial processes. We have surprisingly found out that sulphidizing with elemental sulphur can lead to a very sharp separation between certain metals. For instance nickel, cobalt and copper can be effectively separated from zinc. We have also surprisingly found out that particularly nickel and cobalt can be very effectively precipitated as sulphide by aid of elemental sulphur from their salt solutions, such as sulphate solutions, even in very acidic conditions.

DESCRIPTION OF PREFERRED EMBODIMENTS

Although reaction 1 is thermodynamically possible for many metals also in low temperatures, it is naturally clear that the reaction is slow if sulphur powder is used. The sulphur surface is soon covered with sulphides and the reaction comes to an end. But if the temperature is raised over the melting point of sulphur, it is always possible to gain new sulphur surface. In addition to this, the general prerequisites in higher temperatures are better than in lower temperatures owing to a higher rate of diffusion. The performed experiments have shown that the speed of reaction achieved at the temperature of 150° C. is still sufficiently high.

The experiments were carried out with a mixed hydroxide precipitate in aqueous slurry. It turned out that when the mixed hydroxide precipitate was sulphidized according to reaction 1, only certain metals were dissolved as sulphates, whereas the rest remained in the precipitate as sulphides. When the hydroxide precipitate contained mainly nickel and zinc, as well as smaller amounts of copper, manganese, iron, aluminium and magnesium, the ingredients Ni, Co and Cu remained completely in the precipitate, whereas Mn, Mg, Zn and Fe were dissolved.

The said experiments also proved that while an amount of the sulphide precipitate created according to reaction 1 was present, it was possible to precipitate metals even directly from the sulphide solutions according to the following reaction:

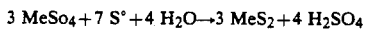

The most surprising result was that this reaction was carried out completely, particularly as regards nickel and cobalt, even in a very acidic solution. Copper is also precipitated in these conditions, whereas zinc is not, if the pH value remains below 2.

The separation of metals, when elemental sulphur is used as the reagent, can be utilized in various processes such as:

Selective precipitation of Ni and/or Co and/or Cu from acidic solutions;

Selective precipitation of Ni and/or Co from for instance Zn solutions;

Separation of Ni and/or Co and/or Cu from zinc from an oxidic or hydroxidic mixed precipitate so that Ni, Co and Cu are obtained as sulphides, whereas Zn is obtained as a water-soluble sulphate.

If Ni or Co or Cu are precipitated from their solutions according to reaction 2, a required amount of crystal seeds must first be prepared according to reaction 1, for example so that some metal oxide or hydroxide is used in the preparation of the crystal seeds. An advantageous proportion of crystal seeds is 3-5 times the amount of the sulphide to be precipitated.

The method can be advantageously utilized for instance in the solution purification in a zinc plant, where the amounts of Ni and Co to be removed from the solution are small, but the separation must necessarily be carried out in order to achieve a pure zinc sulphate solution. In that case crystal seeds must be used in the solution, and the highest pH value for the solution is 2.

EXAMPLE 1

To a solution containing 20 g/l Ni in sulphate form, there was added 20 g/l S°, and the solution was heated in an autoclave with a pH value of about 5. The solution was kept in turn at temperatures 130° C., 150° C. and 170° C., for the duration of 4 hours each. According to the x-ray diffraction analysis of the final precipitate, the precipitate did not contain precipitated $NiS_2$, but only S°.

EXAMPLE 2

There were first prepared Ni sulphide crystal seeds by adding 75 g/l NaOH and 55 g/l elemental sulphur into a Ni sulphate solution, which contained 40 g/l Ni. The slurry was heated up to 150° C. After two hours, the pH value of the solution was 3.45, and the Ni++ content was below 5 mg/l. According to the x-ray diffraction analysis of the precipitate, the precipitate contained only $NiS_2$ and S°. Now into the slurry there was added 10 g/l Ni in sulphate form and 25 g/l S°. The temperature was maintained at 150° C. again for two hours, whereafter the $H_2SO_4$ content of the solution was 23 g/l and the Ni content was 8 mg/l. A new addition of 10 g/l Ni and 25 g/l S° was supplied, and now, after two hours, the $H_2SO_4$ content of the solution was 42 g/l and the Ni content was 7 mg/l. Thus the amount of crystal seeds present in the reaction was fourfold compared to the ones created in the precipitations proper (the two latter ones). From the results we can see that owing to the presence of crystal seeds, the formation of Ni sulphide was effective, but the precipitation does not succeed without crystal seeds, as was proved in Example 1.

EXAMPLE 3

Into an autoclave there was added 300 g metal hydroxide precipitate containing amoung others 13.6% Ni and 16.2% Zn, plus an addition of 55 g S° and 55 g of $H_2So_4$. The mixture was kept at the temperature of 150° C. for 2 hours. Thereafter there was added 90 g Me(OH)$_2$ precipitate and 30 g S°, as well as 20 g $H_2SO_4$. When the mixture was again kept at 150° C. for 2 hours, an addition of $H_2SO_4$ was supplied and the heating was carried on. The $H_2SO_4$ addition was repeated—at both times the amount was 15 g. Results in table form:

| Feeds | | | Precipitate | | Solution | | |
|---|---|---|---|---|---|---|---|
| Me(OH)$_2$ g | S° g | $H_2SO_4$ g | Ni g | Zn g | Ni g | Zn g | pH |
| 200 | 55 | 55 | 20 | 4,0 | 2,5 | 13,0 | 2,75 |
| 90 | 30 | 20 | 18,6 | 3,3 | 2,0 | 16,5 | 2,45 |
| | | 15 | 18,6 | 3,0 | 0,52 | 17,4 | 2,25 |
| | | 15 | 17,0 | 0,95 | 0,15 | 20,6 | 1,60 |

This experiment proves that with the pH value 2, a good selectivity between Ni and Zn can be achieved, because the precipitation of Ni is further continued, whereas Zn is further dissolved from the precipitate.

EXAMPLE 4

In this experiment we simulated a continuous process which is carried out either in several autoclaves or in one single autoclave divided into several different reactors by aid of intermediate walls. An alkali hydroxide precipitate was treated so that the purpose was to transform Ni, Co and Cu into insoluble sulphides, at the same time as Zn and the other metals were dissolved. First there was added Me(OH)$_2$, S° and $H_2SO_4$ so that the pH value was about 2, in which case all of the metal hydroxides were dissolved. In addition to this, there was present an amount of about 100 g/l of mixed $NiS_2$, $CoS_2$ and CuS precipitate which was prepared according to Example 2. When this mixture had been kept at the temperature of 150° C. for 2 hours, there was added some metal hydroxide so that the pH value was raised up to about 2, as well as a small amount of S°. The heating and addition procedures were repeated a few times, and the results are apparent from the table below.

Composition of the Me(OH)$_2$ precipitate (in percentages):

| Ni | Zn | Mn | Mg | Fe | Al |
|---|---|---|---|---|---|
| 13,6 | 16,2 | 2,8 | 1,2 | 4,0 | 0,86 |

| | Feeds | | | Final solution | | | | | | | | | Precipitate | | | | | |
|---|---|---|---|---|---|---|---|---|---|---|---|---|---|---|---|---|---|---|
| Period | Me(OH)$_2$ | S° | $H_2SO_4$ | Ni | Co | Cu | Zn | Mn | Mg | Fe | Al | pH | Ni | Zn | Mn | Mg | Fe | Al |
| no | g | | | mg/l | | | g/l | | | | | | % | | | | | |
| 1 | 300 | 112 | 220 | 21,5* | 810 | <5 | 30,5 | 5,1 | 2,4 | 8,2 | 1,9 | 0,55 | 26,2 | 0,04 | | | | |
| 2 | 73,6 | 27,6 | | 7,0* | 13 | " | 30,3 | 5,0 | 2,4 | 7,6 | 1,2 | 0,65 | 27,8 | 0,08 | | | | |
| 3 | 81,3 | 30,5 | | 64 | <5 | " | 34,0 | 5,9 | 2,8 | 8,0 | 0,8 | 0,51 | 28,0 | 0,08 | | | | |
| 4 | 67,1 | 25,2 | | 26 | " | " | 38,0 | 6,6 | 3,1 | 8,4 | 0,3 | 0,74 | 22,8 | 0,08 | | | | |
| 5 | 40,9 | 15,3 | | 30 | " | " | 37,5 | 6,5 | 3,1 | 7,7 | 0,2 | 0,93 | 25,6 | 0,09 | | | | |
| 6 | 28,7 | 10,7 | | 9 | " | " | 39,5 | 6,7 | 3,3 | 7,8 | 0,1 | 0,99 | 21,2 | 0,21 | | | | |
| 7 | 19,4 | 7,3 | | 38 | " | " | 35,5 | 6,5 | 3,0 | 7,1 | 0,1 | 1,10 | 26,8 | 0,20 | 0,02 | <0,01 | 0,92 | 0,74 |

*g/l

After period 7, 99.9% of Ni is contained in the sulphide precipitate, and 99.4% of Zn is in the solution. Also Mn, Mg and Fe are dissolved. It is further noticed that Co and Cu are also completely sulphidized.

EXAMPLE 5

The experiment was carried out as in Example 2, except that instead of nickel, cobalt was used. In the final solution the Co content was below 5 mg/l and the $H_2SO_4$ content was 44 g/l. The x-ray diffraction analysis revealed $CoS_2$.

I claim:

1. A method for precipitating any and all of the metals nickel, cobalt and copper from an aqueous solution also containing zinc, where the metals are present as sulphates in the solution, comprising forming crystal seeds from oxides or hydroxides of at least one of the metals nickel, cobalt and copper while beginning the precipitation process, and sulphidizing with elemental sulphur as the sole sulphidizing agent, at a temperature which is above the melting point of sulphur, and at a pH value which is below 2 so that any and all of the metals nickel, cobalt and copper are precipitated while zinc remains in solution.

2. The method of claim 1, including carrying out the precipitation at a temperature between 130°–170° C.

3. The method of claim 1, including carrying out the precipitation at a temperature of about 150° C.

4. The method of claim 1, and including using an amount of crystal seeds which is 3 to 5 times an amount of sulphides to be precipitated.

5. The method of claim 1, wherein the aqueous slurry of solution of metals to be precipitated contains one or more of the metals manganese, magnesium and iron which remain soluble after the sulphidizing.

* * * * *